US012638032B2

(12) United States Patent
Cho et al.

(10) Patent No.: US 12,638,032 B2
(45) Date of Patent: May 26, 2026

(54) BOLTING DEVICE

(71) Applicant: LG ENERGY SOLUTION, LTD.,
Seoul (KR)

(72) Inventors: Jun Beom Cho, Daejeon (KR); **Heung
Kun Park, Daejeon (KR); Choon
Kwon Kang, Daejeon (KR); Min Su
Son**, Daejeon (KR)

(73) Assignee: LG ENERGY SOLUTION, LTD.,
Seoul (KR)

( * ) Notice: Subject to any disclaimer, the term of this
patent is extended or adjusted under 35
U.S.C. 154(b) by 227 days.

(21) Appl. No.: 17/928,109

(22) PCT Filed: Nov. 19, 2021

(86) PCT No.: PCT/KR2021/017120
§ 371 (c)(1),
(2) Date: Nov. 28, 2022

(87) PCT Pub. No.: WO2022/108400
PCT Pub. Date: May 27, 2022

(65) Prior Publication Data
US 2023/0213049 A1 Jul. 6, 2023

(30) Foreign Application Priority Data

Nov. 23, 2020 (KR) ........................ 10-2020-0158168

(51) Int. Cl.
F16B 5/02 (2006.01)
B25B 3/00 (2006.01)
B25B 23/10 (2006.01)

(52) U.S. Cl.
CPC .............. F16B 5/0266 (2013.01); B25B 3/00
(2013.01); B25B 23/10 (2013.01)

(58) Field of Classification Search
CPC ....... B25B 15/02; B25B 21/002; B25B 23/00;
B25B 23/005; B25B 23/10; B25B 23/101;
(Continued)

(56) References Cited

U.S. PATENT DOCUMENTS 632,783 A * 9/1899 Farr ........................ B25B 23/00
269/158
5,201,112 A * 4/1993 Sevelinge ............... B23P 19/12
29/714
(Continued)

FOREIGN PATENT DOCUMENTS

CN 204736159 U 11/2015
EP 1566240 B1 * 4/2009 ............. B23Q 17/24
(Continued)

OTHER PUBLICATIONS

Translation of JP 6447764 B1 (Year: 2019).*
(Continued)

*Primary Examiner* — Tom Rodgers
*Assistant Examiner* — Steven Huang
(74) *Attorney, Agent, or Firm* — Birch, Stewart, Kolasch
& Birch, LLP

(57) ABSTRACT

Discussed is a bolting device including an operation part
disposed on a table; a jig disposed on the table to contact an
object to be bolted in which a bolt hole is defined, the jig
including a through-hole for guiding a bolt to the bolt hole;
a guide inserted to the through-hole, the guide having a
hollow shape to accommodate the bolt therein, the guide
having an inclined inner surface with a shape having an
internal diameter that gradually decreases in a downward
direction to maintain verticality of the bolt, and the guide
further having a portion cut in a movement direction of the
bolt so that the inner surface is elastically opened when the
bolt is moved downward; and an elastic part in contact with (Continued)

an outer circumferential surface of the guide to elastically support a surrounding portion of a cut portion of the guide.

13 Claims, 8 Drawing Sheets

(58) Field of Classification Search
CPC ......... B23P 19/006; B23P 19/02; B23P 19/04; B23P 19/06; B23P 19/10; B23P 19/105; B23P 19/12; B25F 1/02; H01M 50/20; B25C 3/00; F16B 5/02; F16B 5/0266; F16B 41/00
USPC .................................................. 81/451, 452
See application file for complete search history.

(56) References Cited

U.S. PATENT DOCUMENTS

| | | | |
|---|---|---|---|
| 5,813,114 A | 9/1998 | Blacket et al. | |
| 2008/0216607 A1 | 9/2008 | Xu | |
| 2011/0130767 A1 * | 6/2011 | Watt ........................ | B25B 23/06 606/104 |
| 2014/0165792 A1 * | 6/2014 | Lu ........................... | B25B 23/10 81/180.1 |
| 2019/0054602 A1 | 2/2019 | Sebree | |
| 2021/0046621 A1 | 2/2021 | Park et al. | |
| 2021/0375510 A1 | 12/2021 | Kim | |

FOREIGN PATENT DOCUMENTS

| | | | | | |
|---|---|---|---|---|---|
| EP | 2 476 518 B1 | | 10/2019 | | |
| JP | 2003-103409 A | | 4/2003 | | |
| JP | 2008-213137 A | | 9/2008 | | |
| JP | 2010142900 A | * | 7/2010 | | |
| JP | 4702350 B2 | | 6/2011 | | |
| JP | 6447764 B1 | * | 1/2019 | | |
| JP | 2019-63976 A | | 4/2019 | | |
| JP | 2019-173861 A | | 10/2019 | | |
| KR | 20-0334053 Y1 | | 11/2003 | | |
| KR | 20-0334689 Y1 | | 11/2003 | | |
| KR | 10-0926375 B1 | | 11/2009 | | |
| KR | 20120000801 A | * | 1/2012 | ............ | B25B 23/08 |
| KR | 10-1957377 B1 | | 3/2019 | | |
| KR | 20-0489171 Y1 | | 5/2019 | | |
| KR | 10-2020-0075445 A | | 6/2020 | | |
| KR | 10-2020-0092783 A | | 8/2020 | | |
| SU | 1463419 A1 | * | 3/1989 | | |

OTHER PUBLICATIONS

Translation of JP 2010142900 A (Year: 2014).*
Translation of SU 1463419 A1 (Year: 1989).*
Translation of KR 20120000801 A (Year: 2012).*
International Search Report (PCT/ISA/210) issued in PCT/KR2021/017120, dated Feb. 22, 2022.
Extended European Search Report for European Application No. 21895167.1, dated Oct. 10, 2023.

* cited by examiner

BOLTING DEVICE

CROSS REFERENCE TO RELATED APPLICATIONS

This application is the National Phase of PCT International Application No. PCT/KR2021/017120, filed on Nov. 19, 2021, which claims priority under 35 U.S.C. 119 (a) to Patent Application No. 10-2020-0158168, filed in the Republic of Korea on Nov. 23, 2020.

TECHNICAL FIELD

The present disclosure relates to a bolting device, and more particularly, to a bolting device capable of securing verticality of a bolt with respect to an object to be bolted.

BACKGROUND ART

A medium and large-sized device such as an electric vehicle requires a high output and large capacity power source. Thus, the medium and large-sized device generally uses a medium and large-sized battery pack in which a plurality of battery cells are electrically connected.

The plurality of battery cells may be connected by serial connection, parallel connection, or a mixed method of the serial connection and the parallel connection and maintain a stable structure against an external impact when connected, so that the medium and large-sized battery pack satisfies the high output and the large capacity required by the medium and large-sized device.

The medium and large-sized battery pack is coupled to all sorts of components such as an outer housing, an inner case, a frame for fixing, a busbar, a printed circuit board, and a heat pump by using a bolt.

The bolt coupling of the medium and large-sized battery pack requires to be exactly performed to maintain the stable structure against the external impact.

When a bolt in an inclined state is coupled, a coupled portion may be mechanically damaged. Although the coupled portion is not damaged, a gap may be generated in the coupled portion, or an unnecessary load may be applied thereto. Thus, the bolt coupled portion may be easily fatigued during usage of the medium and large-sized battery pack, and when an impact is accumulated during driving of the medium and large-sized device, the coupled portion may be quickly damaged.

The background technology of the present disclosure is disclosed in patent documents below.
(Patent document 1) KR10-2020-0075445 A
(Patent document 2) KR10-2020-0092783 A

DISCLOSURE OF THE INVENTION

Technical Problem

The present disclosure provides a bolting device capable of securing verticality of a bolt with respect to an object to be bolted.

Technical Solution

In accordance with an exemplary embodiment, a bolting device includes: an operation part disposed on a table and including a screwdriver bit; a jig part disposed on the table to contact an object to be bolted in which a bolt hole is defined and including a through-hole for guiding a bolt to the bolt-hole; a guide part inserted to the through-hole, having a hollow shape to accommodate the bolt therein, having an inclined inner surface with a shape having an internal diameter that gradually decreases in a downward direction to maintain verticality of the bolt, and having a portion cut in a movement direction of the bolt so that the inner surface is elastically opened when the bolt is moved downward; and an elastic part in contact with an outer circumferential surface of the guide part to elastically support a surrounding portion of a cut portion of the guide part.

The elastic part may include: an installation groove recessed from an inner wall of the through-hole; and an elastic spring extending in a direction crossing the movement direction of the bolt and disposed in the installation groove to protrude to the inside of the through-hole, thereby supporting a lower end of the guide part.

A plurality of installation grooves may be formed and arranged radially around the through-hole, and a plurality of elastic springs may be provided and arranged radially around the through-hole and respectively disposed in the installation grooves, wherein each of the elastic springs may have one end supported by an inner wall of the installation groove and the other end in contact with a lower end of the guide part.

The elastic part may include an elastic ring surrounding an outer circumferential surface of a lower end of the guide part.

The guide part may include: an upper body having an internal diameter equal to a head size of the bolt to contact an end of a head of the bolt; and a lower body having an internal diameter equal to a screw size of the bolt to contact a lower end of a screw of the bolt when contracted.

The lower body may be divided into a plurality of pieces as a portion thereof is cut in the movement direction of the bolt, and the plurality of pieces of the lower body may be arranged along a circumference of the upper body and spaced apart from each other.

The plurality of pieces of the lower body may be elastically supported by the elastic part, and lower ends of the plurality of pieces may be opened in a direction of being spaced apart from each other as the head of the bolt is moved downward.

A portion between an upper end and a lower end of each of the plurality of pieces of the lower body may be elastically bent.

The bolting device may further include an alignment part formed in the object to be bolted and the jig part to diagnose vertical alignment between the through-hole and the bolt hole.

The bolting device may further include a diagnosis part installed on the jig part to diagnose verticality of the bolt by using a length variation of the plurality of elastic springs of the elastic part.

Advantageous Effects

According to the exemplary embodiments, the verticality of the bolt with respect to the object to be bolted may be secured while the bolt is coupled to the bolt hole such that the guide part having the inclined surface with the shape having the internal diameter gradually decreases in the downward direction is disposed in through-hole of the jig part to maintain the verticality of the bolt, and the object to be bolted is guided to the bolt hole by using the guide part.

MODE FOR CARRYING OUT THE INVENTION

Figure 1:
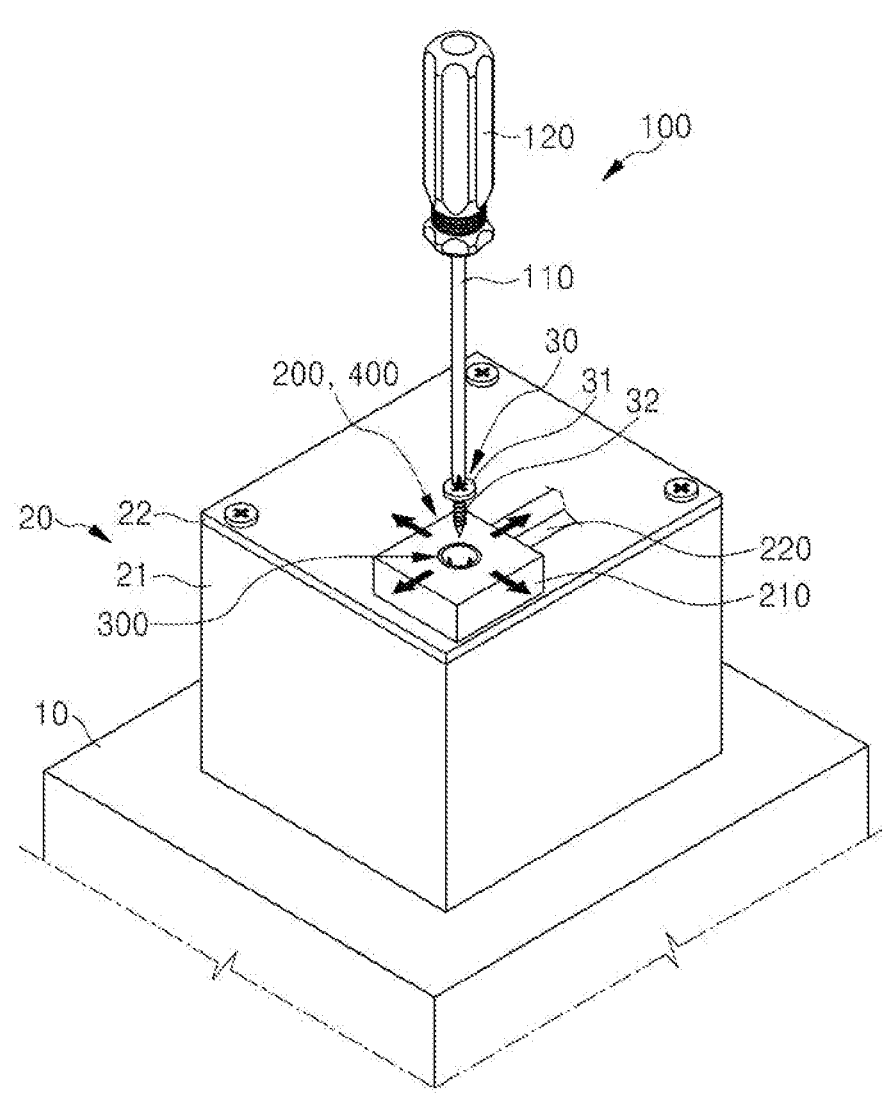
FIG. 1 is a schematic view illustrating a bolting device in accordance with an exemplary embodiment (first embodiment).

Hereinafter, exemplary embodiments of the present invention will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the figures, the dimensions of layers and regions are exaggerated for clarity of illustration. Like reference numerals refer to like elements throughout.

Hereinafter, embodiments of the inventive concept will be described with reference to the accompanying drawings.

<An Exemplary Embodiment (First Embodiment)>

1. Bolting Device in Accordance with an Exemplary Embodiment

Figure 2:
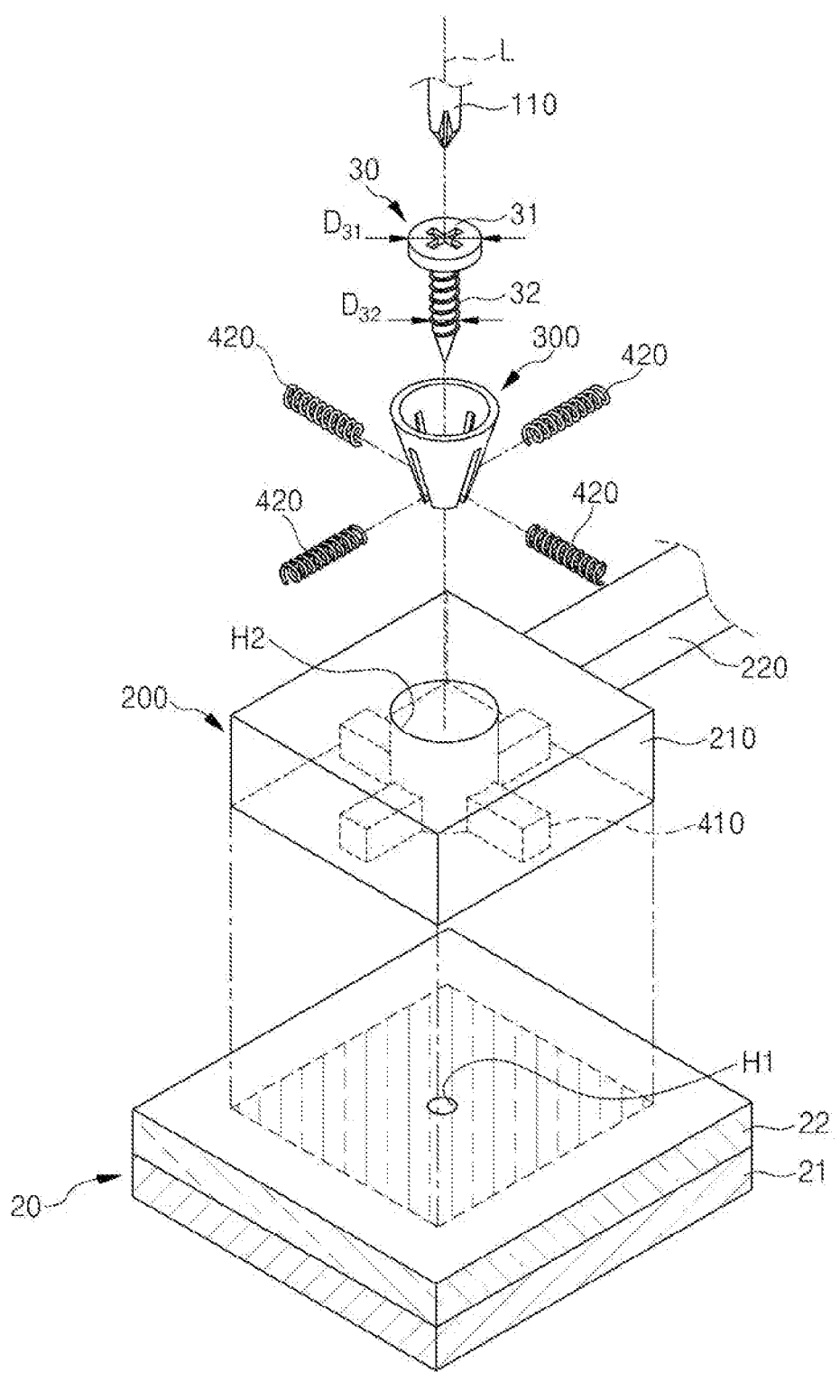
FIG. 2 is an exploded view illustrating the bolting device in accordance with an exemplary embodiment (first embodiment).
Figure 3:
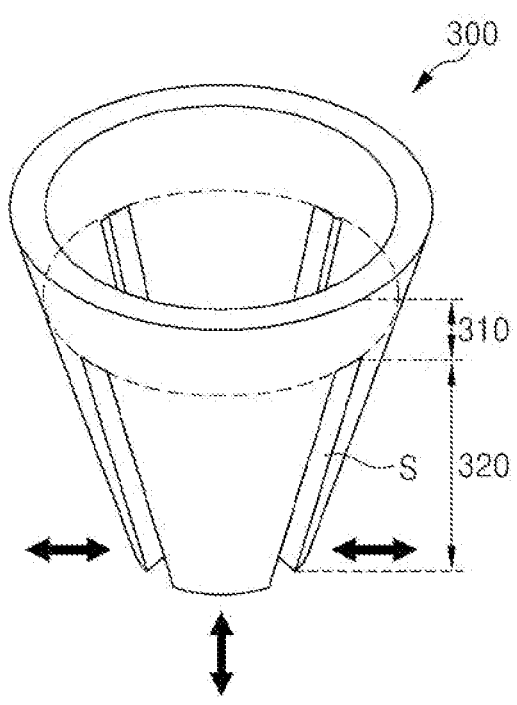
FIG. 3 is a partially enlarged view illustrating the bolting device in accordance with an exemplary embodiment (first embodiment).

FIG. 1 is a schematic view illustrating a bolting device in accordance with an exemplary embodiment. FIG. 2 is an exploded view illustrating the bolting device in accordance with an exemplary embodiment. FIG. 3 is a partially enlarged view illustrating the bolting device in accordance with an exemplary embodiment.

The bolting device in accordance with an exemplary embodiment will be described in detail with reference to FIGS. 1 to 3.

The bolting device in accordance with an exemplary embodiment includes: an operation part 100 disposed on a table 10 and including a screwdriver bit 110; a jig part 200 disposed on the table 10 to contact an object to be bolted in which a bolt hole H1 is formed and including a through-hole H2 for guiding a bolt 30 to the bolt hole H1; a guide part 300 inserted to the through-hole H2, having a hollow shape to accommodate the bolt 30 therein, having a shape having an internal diameter that gradually decreases in a downward direction to maintain verticality of the bolt 30 and having an inclined inner surface, and having a portion cut in a movement direction of the bolt 30 so that the inner surface is elastically opened when the bolt 30 is moved downward; and an elastic part 400 contacting an outer circumferential surface of the guide part 300 to elastically support a surrounding portion of a cut portion S of the guide part 300.

Here, the table 10 may have a top surface having a predetermined area so that the object to be bolted is seated thereon. The object to be bolted may be seated on the top surface of the table 10. The object to be bolted may be a battery pack 20. The battery pack 20 may include a battery pack housing 21 and a battery pack cover 22. At least one hole may be formed through a top surface of the battery pack cover 22. At least one hole may be formed through an upper end of the battery pack housing 21 and connected with the hole of the battery pack cover 22. The bolt hole H1 may be formed as the hole of the battery pack cover 22 is connected with the hole of the battery pack housing 21. A thread may be formed on an inner circumferential surface of the bolt hole H1. The bolt 30 may be screw-coupled to the bolt hole H1, and through this, the battery pack housing 21 and the battery pack cover 22 may be coupled to form the battery pack 20. At least one unit battery cell may be provided in the battery pack 20.

Also, the object to be bolted may include various objects in addition to the battery pack 20.

The bolt 30 includes a head 31 and a screw 32. One of a straight slot groove and a cross groove may be formed in a top surface of the head 31. The screwdriver bit 110 may be inserted to the straight slot groove or the cross groove of the head 31, and the head 31 may rotate by rotation of the screwdriver bit 110 and allow the screw 32 to rotate. The screw 32 may include a round bar and a spiral thread. The round bar may extend downward from a bottom surface of the head 31. The thread may have a spiral shaped structure on an outer circumferential surface of the round bar. When the head 31 rotates by the screwdriver bit 110, the screw 32 may also rotate in the same manner and be moved forward into the bolt hole H1 by the thread. Alternatively, the bolt 30 may have various structures.

1.1. Operation Part 100 in Accordance with an Exemplary Embodiment

The operation part 100 may be a manual screwdriver. The operation part 100 may include the screwdriver bit 110 and an operation part body 120. For example, the screwdriver bit 110 may include a shank and a screwdriver tip. The screwdriver tip may be formed at a lower end of the shank. The screwdriver tip may be inserted and coupled to the straight slot groove or the cross groove defined in the head 31. Alternatively, the screwdriver tip may have a shape of a cross shape, a straight shape, a rectangular shape, and a hexagonal shape. Also, the groove defined in the head 31 of the bolt 30 may have various shapes such as a cross groove shape, a straight slot groove shape, a rectangular groove shape, and a hexagonal groove shape. The shank may have an upper end detachable from the operation part body 120.

The operation part 100 may be an electric screwdriver. When the operation part 100 is the electric screwdriver, a rotation motor may be disposed in the operation part body 120 and connected to the upper end of the shank. The rotation motor may be connected with a power supply through a predetermined line. A button may be disposed on an outer circumferential surface of the operation part body 120, and as a current flows through the line by pushing the button, the rotation motor may rotate.

The operation part 100 may be spaced a predetermined height upward from the table 10 and operated by a robot arm (not shown) or a manipulator (not shown).

1.2. Jig Part 200 in Accordance with an Exemplary Embodiment

The jig part 200 may be seated on the top surface of the battery pack cover 22. The jig part 200 may a block 210 and a support 220. The block 210 may supported by the support 220. A position of the block 210 may be adjusted in a horizontal direction by using a method of moving the support 220 relatively to the battery pack cover 22. The support 220 may be moved and fixed by a predetermined robot arm or a manipulator.

The block 210 may have a predetermined area in the horizontal direction and a predetermined thickness in the vertical direction. The through-hole H2 may pass through a center of the block 210 in the vertical direction. The through-hole H2 may have an internal diameter greater than that of the bolt hole H1.

The block 210 may accommodate the guide part 300 through the though-hole H2, align a position of the guide part 300 to a central axis L of the bolt hole H1 in the vertical direction, and support the guide part 300 while the bolt 30 is screw-coupled to the bolt hole H1.

1.3. Guide Part 300 in Accordance with an Exemplary Embodiment

The guide part 300 may support the bolt 30 in the through-hole H2 and guide the bolt 30 to the bolt hole H1. The guide part 300 may have a hollow shape to accommodate the bolt 30 therein. The guide part 300 may have a shape having an internal diameter that gradually decreases in a direction from the top to the bottom thereof. Thus, the guide part 300 may have an inclined inner surface. Thus, the bolt 30 may be supported by the inner surface and maintain the verticality in the guide part 300. Specifically, an end of the head of the bolt 30 may contact and be supported by an upper portion of the inner surface of the guide part 300, and a lower end of the screw of the bolt 30 may contact and be supported by a lower portion of the inner surface of the guide part 300. Thus, the bolt 30 may maintain the verticality. The guide part 300 may have a portion cut along the movement direction of the bolt so that the inner surface is elastically opened when the bolt 30 is moved downward.

Also, the guide part 300 may be made of a predetermined elastic material and prevent a damage such that the inner surface is contracted in a direction of being adjacent to each other or opened in a direction of being spaced apart from each other according to a position of the head 31 of the bolt 30. Here, the predetermined elastic material may include various materials including, e.g., a silicon material, a resin material, and a plastic material.

The guide part 300 may include an upper body 310 having an internal diameter that is the same in size as a head size $D_{31}$ of the bolt to contact the end of the head 31 of the bolt 30 and a lower body 320 having an internal diameter that is the same in size as a screw size $D_{32}$ of the bolt to contact a lower end of the screw 32 of the bolt 30 when contracted.

The upper body 310 may have a hollow shape and have an internal diameter and an external diameter, which gradually decrease in a direction from the top to the bottom thereof. The upper body 310 may have a horizontal cross-section of a ring shape. The upper body 310 may have a lower end having an internal diameter equal to the head size $D_{31}$ of the bolt and an upper end having an internal diameter greater than that of the lower end.

The lower body 320 may extend downward from the lower end of the upper body 310. The lower body 320 may be divided into a plurality of pieces as a portion thereof is cut in the movement direction of the bolt 30. The plurality of pieces of the lower body 320 may be arranged along a circumference of the upper body 310 and spaced apart from each other.

When the head 31 of the bold 30 is positioned at the upper body 310, the lower end of the lower body 320 may have the internal diameter equal to the screw size $D_{32}$ of the bolt 30. Here, the internal diameter of the lower end of the lower body 320 may be expressed as a spaced distance of lower ends of the plurality of pieces of the lower body 320, which are spaced apart from each other, when the head 31 of the bolt 30 is positioned at the upper body 310.

Cut portions S of the lower body 320 may be spaced apart from each other along the circumference of the upper body 310 and extend from the upper end to the lower end of the lower body 320. The cut portions S of the lower body 320 allow movements of the lower ends of the plurality of pieces of the lower body 320 not to be constrained.

The plurality of pieces of the lower body 320 may be elastically supported by the elastic part 400. Here, the lower ends of the plurality of pieces of the lower body 320 may be opened in a direction of being spaced apart from each other as the head 310 of the bolt 30 is moved downward after the head 310 of the bolt 30 is moved from the upper body 310 to the lower body 320. The feature in which the lower ends of the plurality of pieces of the lower body 320 are opened in the direction of being spaced apart from each other is referred to as expansion.

Here, when the plurality of pieces of the lower body 320 are opened in the direction of being spaced apart from each other, the spaced distance of the lower ends of the plurality of pieces of the lower body 320, which are spaced apart from each other while facing each other, may be referred to as a size of the internal diameter when the lower body 320 is expanded, and the size may be equal to the head size $D_{31}$ of the bolt 30.

Also, the lower ends of the plurality of pieces of the lower body 320 may be elastically supported by the elastic part 400 and contracted in a direction of being adjacent to each other when the head 310 of the bolt 30 is positioned at the upper body 310.

Here, when the plurality of pieces of the lower body 320 are contracted in the direction of being adjacent to each other, the spaced distance of the lower ends of the plurality of pieces of the lower body 320, which are spaced apart from each other while facing each other, may be referred to as a size of the internal diameter when the lower body 320 is contracted, and the size may be equal to the screw size $D_{32}$ of the bolt 30.

As described above, as the lower ends of the plurality of pieces of the lower body 320 are opened in the direction of being spaced apart from each other or contracted in the direction of being adjacent to each other according to the position of the head 31 of the bolt 30, the verticality of the bolt 30 may be always maintained.

1.4. Elastic Part 400 in Accordance with an Exemplary Embodiment

The elastic part 400 may elastically support the lower body 320 when the lower body 320 of the guide part 300 is expanded or contracted. The elastic part 400 may include an installation groove 410 recessed from an inner wall of the through-hole H2 and an elastic spring 420 extending in a direction crossing the movement direction of the bolt 30, disposed in the installation groove 410 to protrude to the inside of the through-hole H2, and supporting the lower end of the guide part 300.

A plurality of installation grooves 410 may be formed in the block 210 and arranged radially around the through-hole H2. A plurality of elastic springs 420 may be provided, arranged radially around the through-hole H2, and respectively disposed in the installation grooves 410. Here, each of the elastic springs 420 may have one end supported by the inner wall of the installation groove 410 and the other end contacting the lower end of the lower body 320 of the guide part 300. Thus, the plurality of elastic springs 420 may uniformly elastically support the plurality of pieces of the lower body 320 of the guide part 300.

1.5. Operation Method of Bolting Device in Accordance with an Exemplary Embodiment FIGS. 4 to 6 are schematic views for explaining an operation of the bolting device in accordance with an exemplary embodiment.

Figure 4:
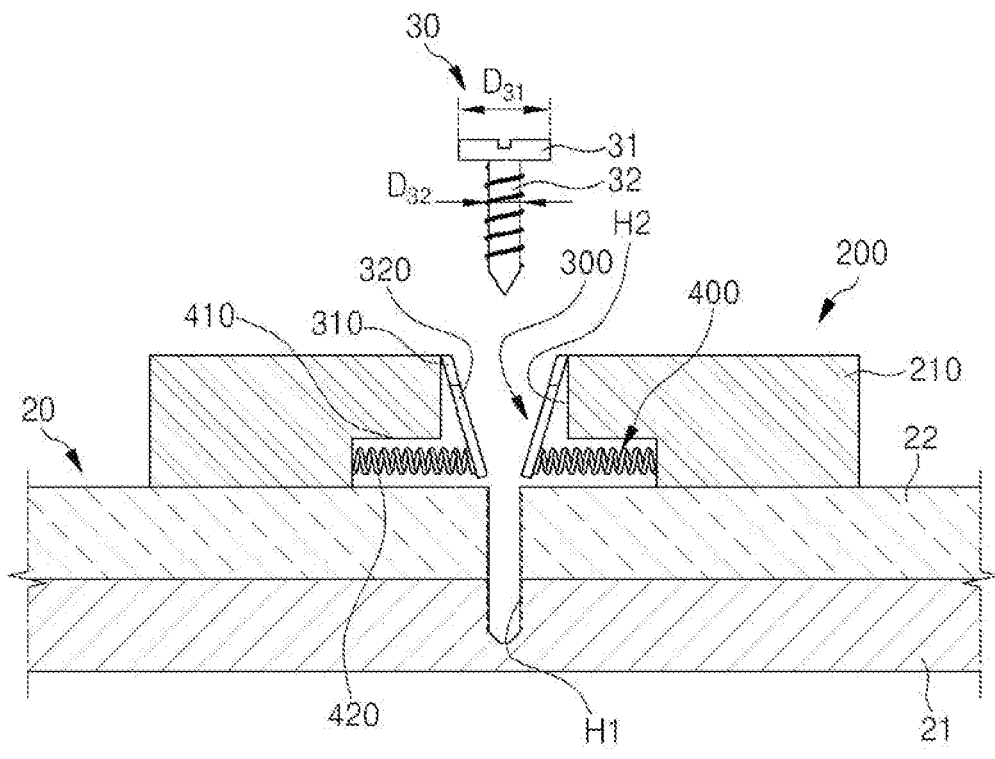
FIGS. 4 to 6 are schematic views illustrating the bolting device in accordance with an exemplary embodiment (first embodiment).

Referring to FIG. 4, the jig part 200 is moved so that the through-hole H2 is vertically aligned onto the bolt hole H1 into which the bolt 30 is bolted and disposed on the top surface of the battery pack cover 22. Here, the lower end of the upper body 310 of the guide part 300 may have an internal diameter equal to an external diameter of the head 31 of the bolt 30, i.e., the head size $D_{31}$. Here, the lower end of the lower body 320 of the guide part 300 may have an internal diameter equal to an external diameter of the screw 32 of the bolt 30, i.e., the screw size $D_{32}$. Here, the lower end of the lower body 320 of the guide part 300 may be elastically supported by the elastic spring 420 of the elastic part 400.

Figure 5:
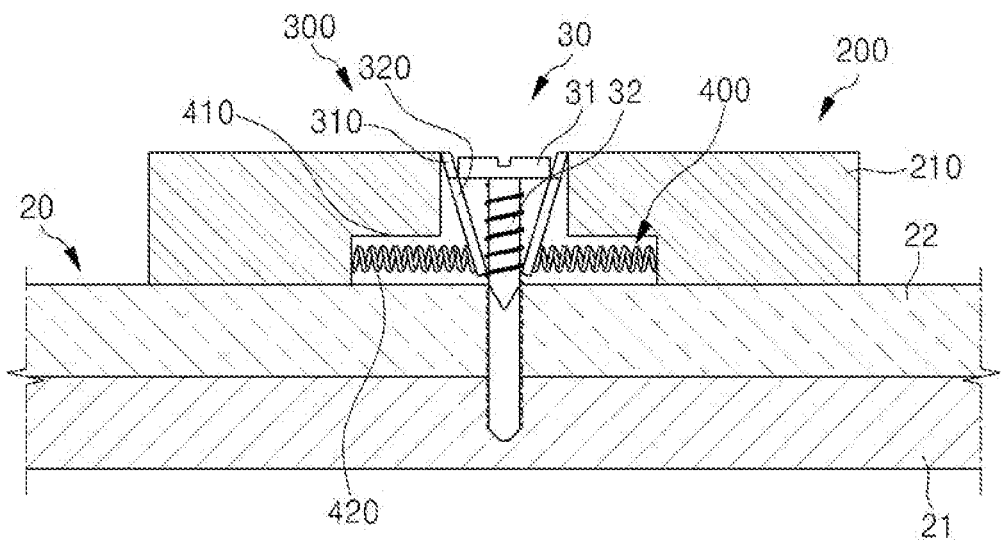

Referring to FIG. 5, the bolt 30 is disposed in the guide part 300. Here, the end of the head 31 of the bolt 30 may contact to be supported by the upper portion of the inclined inner surface of the guide part 300, and the lower end of the screw 32 of the bolt 30 may contact to be supported by the inclined inner surface of the guide part 300 so that the bolt 30 is vertically supported in the guide part 300.

Figure 6:
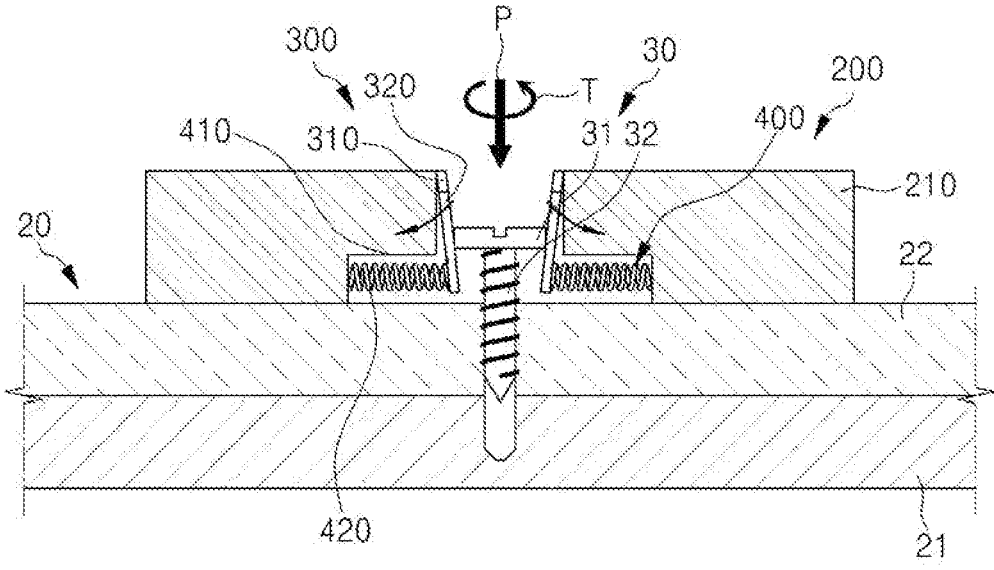

Referring to FIG. 6, the bolt 30 may be moved forward P into the bolt hole H1 by applying a predetermined torque T to the head 31 of the bolt 30. Here, the head 31 of the bolt 30 may be entered to the lower body 320 of the guide part 300 and gradually descended downward. Here, the lower body 320 of the guide part 300 is elastically expanded to maintain contact with the head 31 of the bolt 30 and continuously support the verticality of the bolt 30.

Thereafter, the bolt 30 may be continuously moved forward P so that the screw 32 of the bolt 30 is entered until the battery pack housing 21, and the battery pack cover 22 and the battery pack housing 21 may be coupled by the bolt 30.

The bolting device in accordance with an exemplary embodiment is described in detail with reference to FIGS. 1 to 6. However, the bolting device in accordance with an exemplary embodiment may be variously deformed as in another exemplary embodiment to further still another exemplary embodiment.

<Another Exemplary Embodiment (Second Embodiment)>

2. Bolting Device in Accordance with Another Exemplary Embodiment

Figure 7:
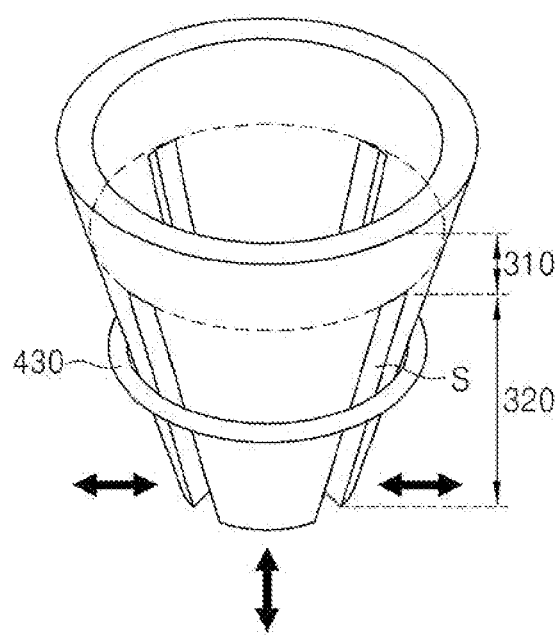
FIG. 7 is a partially enlarged view illustrating a bolting device in accordance with another exemplary embodiment (second embodiment).
Figure 8:
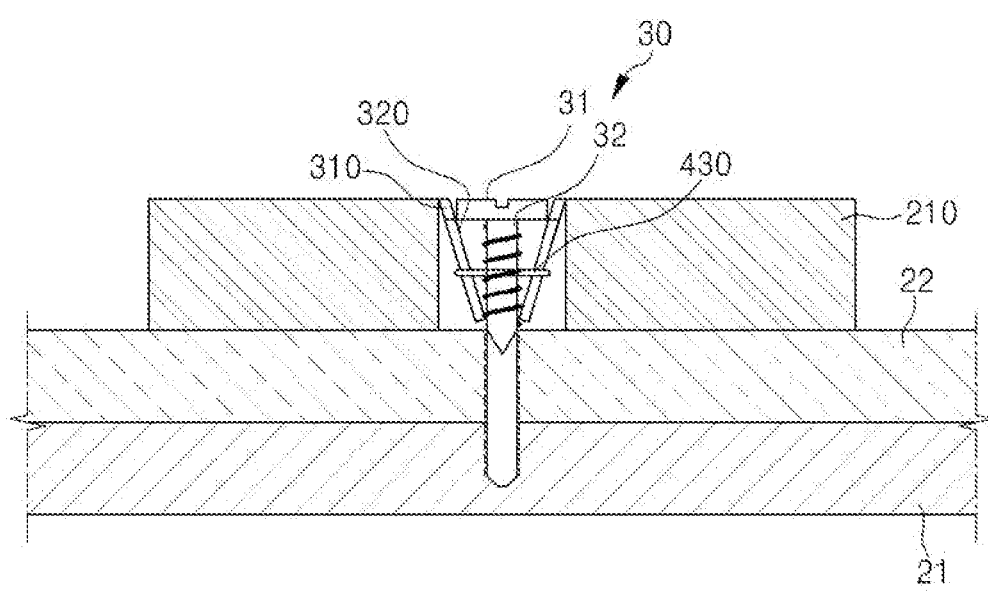
FIGS. 8 to 9 are schematic views illustrating a bolting device in accordance with another exemplary embodiment (second embodiment).
Figure 9:
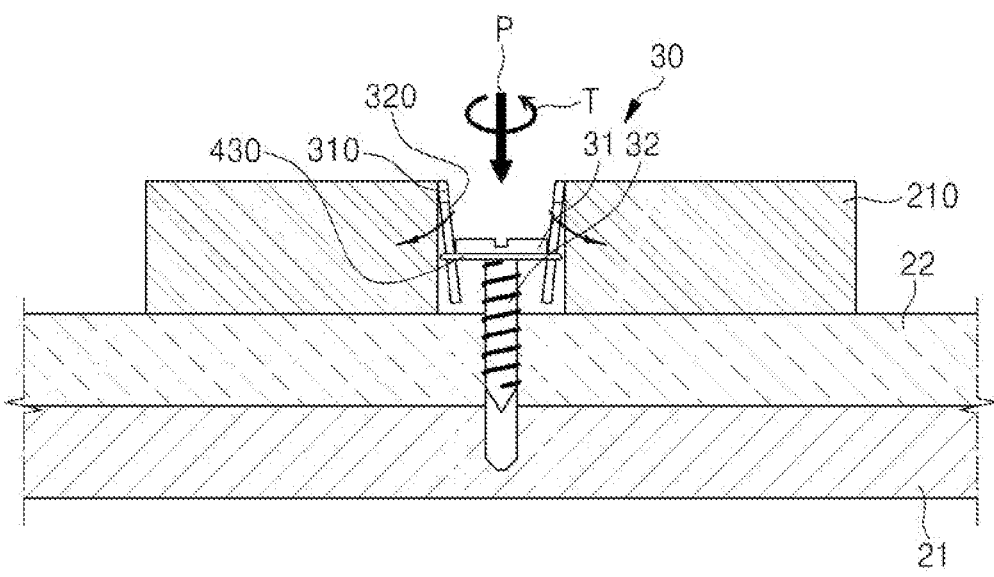

FIG. 7 is a partially enlarged view illustrating a bolting device in accordance with another exemplary embodiment. FIGS. 8 to 9 are schematic views illustrating the bolting device in accordance with another exemplary embodiment.

The bolting device in accordance with another exemplary embodiment will be described in detail with reference to FIGS. 7 to 9.

Here, the another exemplary embodiment will be described in terms of a different point between the bolting device in accordance with an exemplary embodiment and the bolting device in accordance with another exemplary embodiment.

Also, a common point of the bolting device in accordance with an exemplary embodiment and the bolting device in accordance with another exemplary embodiment will not be described.

The bolting device in accordance with an exemplary embodiment is different in structure of the elastic part 400 from the bolting device in accordance with another exemplary embodiment.

2.1. Elastic Part 400 in Accordance with Another Exemplary Embodiment

Referring to FIGS. 7 and 8, an elastic part 400 in accordance with another exemplary embodiment may include an elastic ring 430 surrounding an outer circumferential surface of a lower end of a guide part 300. Here, the elastic ring 430 may surround an outer circumferential surface of a lower body 320 of the guide part 300. Thus, in accordance with another exemplary embodiment, a through-hole H1 may have a simplified inner structure.

Also, a predetermined projection (not shown) may be formed on the outer circumferential surface of the lower body 320 of the guide part 300 to prevent deviation of the elastic ring 430, and the elastic ring 430 may be supported by the projection.

2.2. Operation Method of Elastic Part 400 in Accordance with Another Exemplary Embodiment Referring to FIG. 8, when a head 31 of a bolt 30 is disposed at an upper body 310 of the guide part 300, the elastic ring 430 may be contracted to tighten the lower body 320 of the guide part 300.

Referring to FIG. 3, while the head 31 of the bolt 30 may be entered to the lower body 320 of the guide part 300 and then descended downward, the elastic ring 430 may be expanded to elastically support opening of the lower body 320 of the guide part 300. Thus, the bolt 30 may maintain the verticality.

<Yet Another Exemplary Embodiment (Third Embodiment)>

3. Bolting Device in Accordance with Yet Another Exemplary Embodiment

Figure 10:
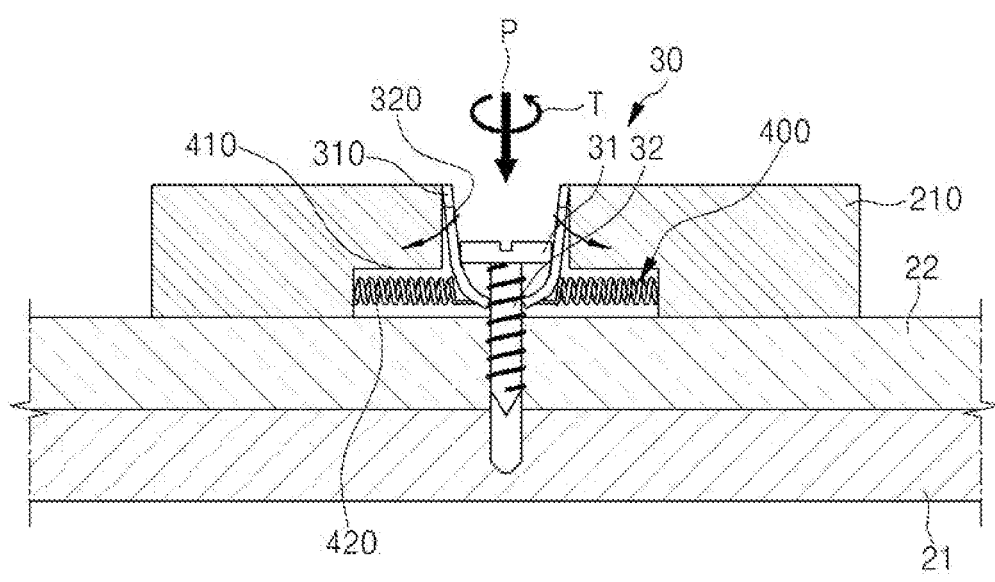
FIG. 10 is a schematic view illustrating a bolting device in accordance with yet another exemplary embodiment (third embodiment).

FIG. 10 is a schematic view illustrating a bolting device in accordance with yet another exemplary embodiment.

Referring to FIG. 10, the bolting device in accordance with yet another exemplary embodiment is different in elastic modulus of an elastic spring 420 from the bolting device in accordance with an exemplary embodiment. For example, the elastic spring 420 of the bolting device in accordance with yet another exemplary embodiment may have an elastic modulus greater than that of the elastic spring 420 of the bolting device in accordance with an exemplary embodiment. Thus, the elastic spring 420 in accordance with yet another exemplary embodiment may further strongly support a lower body 320 of a guide part 300. Through this, while a head 31 of a bolt 30 is entered to the lower body 320 of the guide part 300 and then descended downward, a portion between an upper end and a lower end of each of a plurality of pieces of the lower body 320 may be elastically bent.

<Still Another Exemplary Embodiment (Fourth Embodiment)>

4. Bolting Device in Accordance with Still Another Exemplary Embodiment

Figure 11:
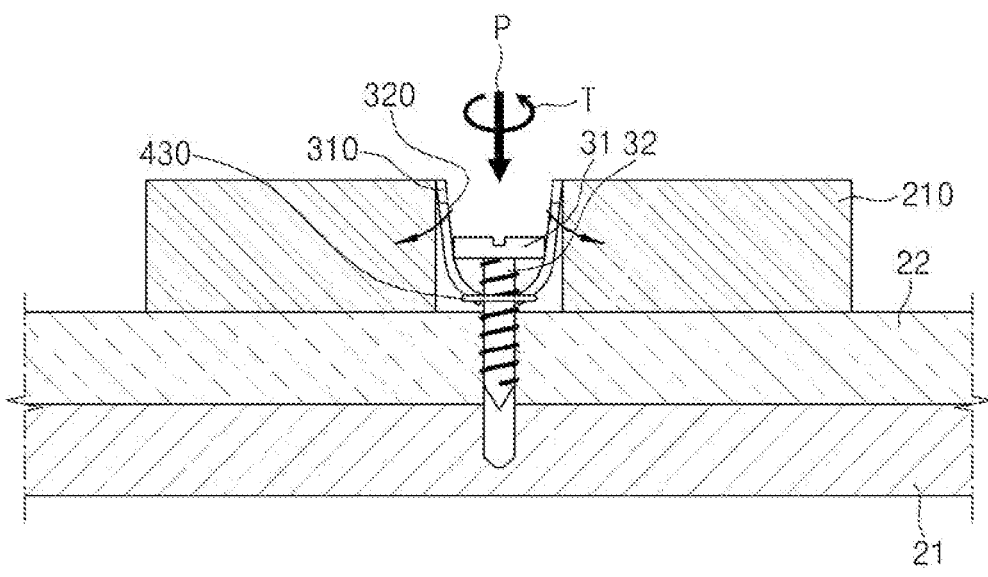
FIG. 11 is a schematic view illustrating a bolting device in accordance with still another exemplary embodiment (fourth embodiment).

FIG. 11 is a schematic view illustrating a bolting device in accordance with still another exemplary embodiment.

Referring to FIG. 11, the bolting device in accordance with still another exemplary embodiment is different in elastic modulus and installation position of an elastic ring 430 from the bolting device in accordance with another exemplary embodiment. For example, the elastic ring 430 of the bolting device in accordance with still another exemplary embodiment may have an elastic modulus greater than that of the elastic ring 430 of the bolting device in accordance with another exemplary embodiment. Also, the elastic ring 430 of the bolting device in accordance with still another exemplary embodiment may be installed on an outer circumferential surface of a lower end of a lower body 320 of a guide part 300. Thus, the elastic ring 430 in accordance with still another exemplary embodiment may further strongly support the lower body 320 of the guide part 300. Through this, while a head 31 of a bolt 30 is entered to the lower body 320 of the guide part 300 and then descended downward, a portion between an upper end and a lower end of each of a plurality of pieces of the lower body 320 may be elastically bent.

<Yet Still Another Exemplary Embodiment (Fifth Embodiment)>

5. Bolting Device in Accordance with Yet Still Another Exemplary Embodiment

Figure 12:
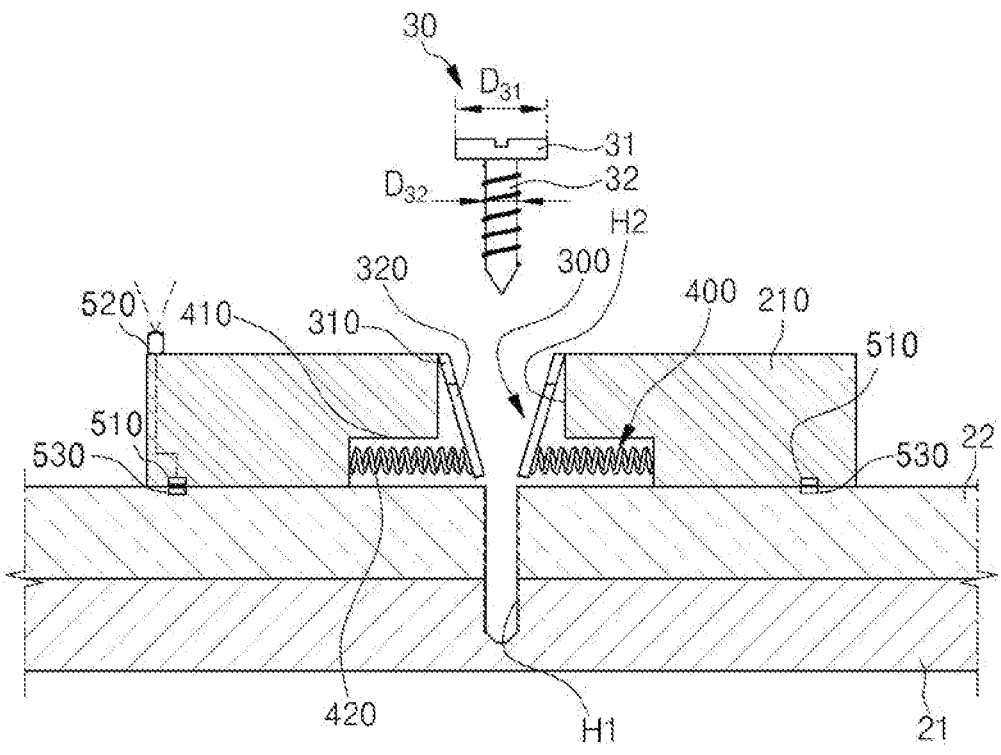
FIG. 12 is a schematic view illustrating a bolting device in accordance with yet still another exemplary embodiment (fifth embodiment).

FIG. 12 is a schematic view illustrating a bolting device in accordance with yet still another exemplary embodiment.

Referring to FIG. 12, the bolting device in accordance with yet another exemplary embodiment may further include an alignment part 510, 520, and 530 in addition to components of the bolting device in accordance with an exemplary embodiment and components of the bolting device in accordance with another exemplary embodiment.

5.1. Alignment Part in Accordance with Yet Still Another Exemplary Embodiment

The alignment part is formed in an object to be bolted and a jig part 200 to diagnose vertical alignment of a bolt hole H1. Specifically, the alignment part may include a first sensor 510 formed at a plurality of positions of a bottom surface of a block 210 of the jig part 200 and spaced a predetermined distance in the horizontal direction from a central axis of a through-hole H2, an indicator 520 connected with the first sensor 510 and notifying a sensing result of the first sensor 520 by using at least one method of light or sound, and a mark 530 formed at a plurality of positions of a top surface of the object to be bolted, e.g., a battery pack cover 22, and spaced a predetermined distance from a central axis of the bolt hole H1.

Here, a spaced distance between a central axis of the through-hole H2 and the first sensor 510 may be equal to that between the central axis of the bolt hole H1 and the mark 530. Also, the number of the first sensor 510 may be three or more, and the number of the mark 530 may be equal to that of the first sensor 510. Also, the plurality of first sensors 510 may be spaced by the same angle from each other on a bottom surface of a block 310 around the central axis of the through-hole H2. Similarly, the plurality of marks 530 may be spaced by the same angle from each other on the top surface of the battery pack cover 22 around the central axis of the bolt hole H1. Thus, when the plurality of first sensors 510 are aligned to the plurality of marks 530, the central axis of the bolt hole H1 may be vertically aligned to the central axis of the through-hole H2.

When all of the plurality of first sensors 510 respectively contact the plurality of marks 530, a sensing signal is outputted to the indicator 520, and the indicator 520 outputs the sensing signal by using at least one method of light or sound and notifies the sensing result to the manipulator. Thus, the vertical alignment between the first sensor 510 and the mark 530 may be easily checked, and the vertical alignment between the central axis of the bolt hole H1 and the central axis of the through-hole H2 may be easily checked.

Here, the method for sensing the mark 530 by the first sensor 510 may be variously provided. The first sensor 510 may be a sensor for sensing a pressure, and the mark 530 may protrude by a predetermined height from the top surface of the battery pack cover 22. When the first sensor 510 is disposed on the mark 530, the first sensor 510 may be pressed upward and retracted into a block 210 to sense the mark 530.

The first sensor 520 may be a sensor for sensing a current. Each of the plurality of first sensors 520 may include a first lead and a second lead on a bottom surface thereof. The mark 530 may include an electrically conductive material. When the first sensor 520 contacts the mark 530, and all of the first lead and the second lead are disposed on a top surface of the mark 530, a current may flow between the first lead and the second lead through the mark 530, and here, the first sensor 520 may sense the current.

The first sensor 520 may be a sensor for sensing an optical signal. Each of the plurality of first sensors 520 may include a light receiving part and a light emitting part on the bottom surface thereof. The mark 530 may be a predetermined material that transmits and scatters light therethrough. When the first sensor 520 contacts the mark 530, and all of the light receiving part and the light emitting part are disposed on the top surface of the mark 530, light emitted from the light emitting part may be scattered in the mark 530, a portion thereof may be incident to the light receiving part, and the incident optical signal may be sensed by the first sensor 520.

In addition, the method for sensing the contact with the mark 530 by the first sensor 501 may be variously provided.

<Further Still Another Exemplary Embodiment (Sixth Embodiment)>

6. Bolting Device in Accordance with Further Still Another Exemplary Embodiment

Figure 13:
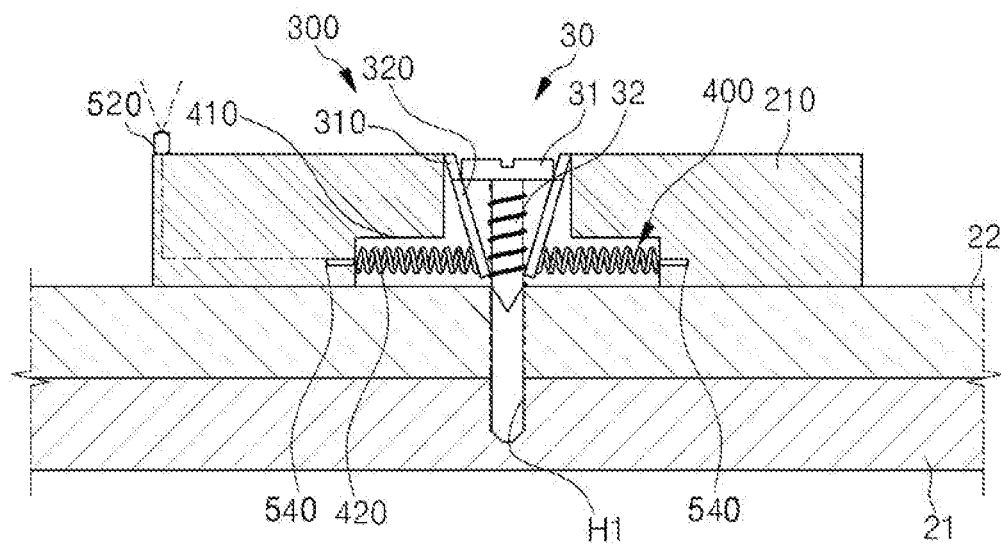
FIG. 13 is a schematic view illustrating a bolting device in accordance with further still another exemplary embodiment (sixth embodiment).

FIG. 13 is a schematic view illustrating a bolting device in accordance with further still another exemplary embodiment.

Referring to FIG. 13, the bolting device in accordance with further still another exemplary embodiment may further include a diagnosis part 520 and 540 in addition to the components of the bolting device in accordance with an exemplary embodiment.

6.1. Diagnosis Part in Accordance with Further Still Another Exemplary Embodiment The diagnosis part may be installed on a jig part 200 to diagnose verticality of a bolt 30 by using a length variation of each of a plurality of elastic springs 420 of an elastic part 400.

The diagnosis part may include a plurality of second sensors 540 respectively connected to the plurality of elastic springs 420 and an indicator 520 for outputting an alarm signal when strain values of the plurality of elastic springs 420 outputted from the plurality of second sensors 540 are equal to each other.

The second sensor 540 may measure a length variation of each of the plurality of elastic springs 420 and calculate a strain of each of the plurality of elastic springs 420 to output the calculated strain to the indicator 520.

Here, a method of measuring the length variation by the second sensor 540 may adopt, e.g., a measurement method of a strain gauge. Alternatively, the method of measuring the length variation by the second sensor 540 may be variously provided. For example, the second sensor 540 may adopt a measurement method of a distance sensor using a laser beam or an ultrasonic wave.

The plurality of second sensors 540 may respectively measure length variations of the plurality of elastic springs 420 and calculate strains thereof to output the calculated strain to the indicator 520. The indicator 520 may output an alarm when the inputted strain values are equal to each other within a predetermined error range.

That is, when the length variations of the plurality of elastic springs 420 are equal to each other, the indicator 520 may output the alarm. When the alarm is outputted, the manipulator may check that the length variations of the plurality of elastic springs 420 are equal to each other, and through this, may exactly check in real time that the verticality of the bolt 30 is maintained.

For example, when the verticality of the bolt 30 is not maintained, and the bolt is inclined to one side, the elastic spring 420 at the one side to which the bolt 30 may be inclined is contracted relatively more or less, and the plurality of elastic springs 420 may have a difference in length variation. The difference in length variation may be sensed by the indicator 520, and the alarm may be turned-off. Thus, the manipulator may exactly check that the bolt 30 is inclined when the alarm is turned-off.

Here, the above error range may be determined as a predetermined range by reflecting an installation error of each of the plurality of second sensors 540 and an own measurement error of the sensor itself.

Although the embodiments of the present invention have been described, it is understood that the present invention should not be limited to these embodiments but various changes and modifications can be made by one ordinary skilled in the art within the spirit and scope of the present invention as hereinafter claimed. Therefore, it will be readily understood by those skilled in the art that various modifications and changes can be made thereto without departing from the spirit and scope of the present invention defined by the appended claims.

What is claimed is:

1. A bolting device comprising:
an operation part disposed on a table;
a jig disposed on the table to contact an object to be bolted in which a bolt hole is defined, the jig comprising a through-hole configured to guide a bolt to the bolt hole;
a guide inserted to the through-hole, the guide having a hollow shape configured to accommodate the bolt therein, the guide having an inclined inner surface with a shape having an internal diameter that gradually decreases in a downward direction to maintain verticality of the bolt, and the guide further having a cut portion in a movement direction of the bolt so that the inclined inner surface is elastically opened when the bolt is to be moved downward; and
an elastic part in contact with an outer circumferential surface of the guide to elastically support a surrounding portion of the cut portion of the guide,
wherein the guide comprises:
an upper body having one end with an internal diameter equal to a head size of the bolt to contact an end of a head of the bolt, the upper body having an annular cross section with the internal diameter gradually decreasing in the downward direction from the one end; and
a lower body having one end with an internal diameter equal to a screw size of the bolt to contact a lower end of a screw of the bolt when contracted, wherein the lower body is divided into a plurality of pieces by cuts of the cut portion in the movement direction of the bolt, wherein the plurality of pieces of the lower body are arranged along a circumference of the upper body and spaced apart from each other, and the cuts form spacings that are interposed between immediately adjacent pieces of the plurality of pieces, wherein the upper body and the lower body of the guide are integrally formed as contiguous parts of the guide, the upper body is a single contiguous piece, and the upper body and the lower body are made of an elastic material, wherein the elastic part comprises:
an installation groove recessed from an inner wall of the through-hole; and
an elastic spring extending in a direction crossing the movement direction of the bolt and disposed in the installation groove to protrude to an inside of the through-hole, thereby supporting a lower end of the guide, and wherein the cuts of the cut portion are located only in the lower body among the lower body and the upper body so that the plurality of pieces of the lower body are contiguous with the upper body.

2. The bolting device of claim 1, wherein the installation groove comprises a plurality of installation grooves that are formed and are arranged radially around the through-hole, and
wherein the elastic spring further comprises a plurality of elastic springs arranged radially around the through-hole and respectively disposed in the plurality of installation grooves,
wherein each of the plurality of elastic springs has one end supported by an inner wall of a respective installation groove and another end in contact with the lower end of the guide.

3. The bolting device of claim 2, further comprising a diagnosis part installed on the jig to diagnose verticality of the bolt by using a length variation of the plurality of elastic springs of the elastic part.

4. The bolting device of claim 3, wherein the diagnosis part includes:
a plurality of second sensors respectively connected to the plurality of elastic springs; and
an indicator configured to output an alarm signal when strain values of the plurality of elastic springs outputted from the plurality of second sensors are equal to each other.

5. The bolting device of claim 1, wherein the elastic part comprises an elastic ring surrounding an outer circumferential surface of the lower end of the guide.

6. The bolting device of claim 1, wherein the plurality of pieces of the lower body are elastically supported by the elastic part, and lower ends of the plurality of pieces are opened in a direction of being spaced apart from each other as the head of the bolt is to be moved downward.

7. The bolting device of claim 1, wherein a portion of the plurality of pieces of the lower body is elastically bent.

8. The bolting device of claim 1, further comprising an alignment part formed in the object to be bolted and the jig to diagnose vertical alignment between the through-hole and the bolt hole.

9. The bolting device of claim 8, wherein the alignment part includes:
a plurality of first sensors formed at a plurality of positions of a bottom surface of a block of the jig and spaced a predetermined distance in a horizontal direction from a central axis of the through-hole;

an indicator connected with the plurality of first sensors and configured to notify a sensing result of the plurality of first sensors by using one of light or sound; and a mark formed at a plurality of positions of a top surface of the object to be bolted, and spaced a predetermined distance from a central axis a of the bolt hole in the object to be bolted.

10. The bolting device of claim 1, wherein the operation part comprises a screwdriver bit.

11. The bolting device of claim 1, wherein an internal diameter of the through-hole is greater than an internal diameter of the bolt hole.

12. The bolting device of claim 1, wherein a maximum external diameter of the upper body of the guide is about the same as an internal diameter of the through-hole.

13. The bolting device of claim 1, wherein an internal diameter of the one end of the lower body is equal to an internal diameter of the bolt hole.

* * * * *